R. C. ERWIN.
SELF LUBRICATING SPRING.
APPLICATION FILED DEC. 27, 1915.
1,249,361.
Patented Dec. 11, 1917.
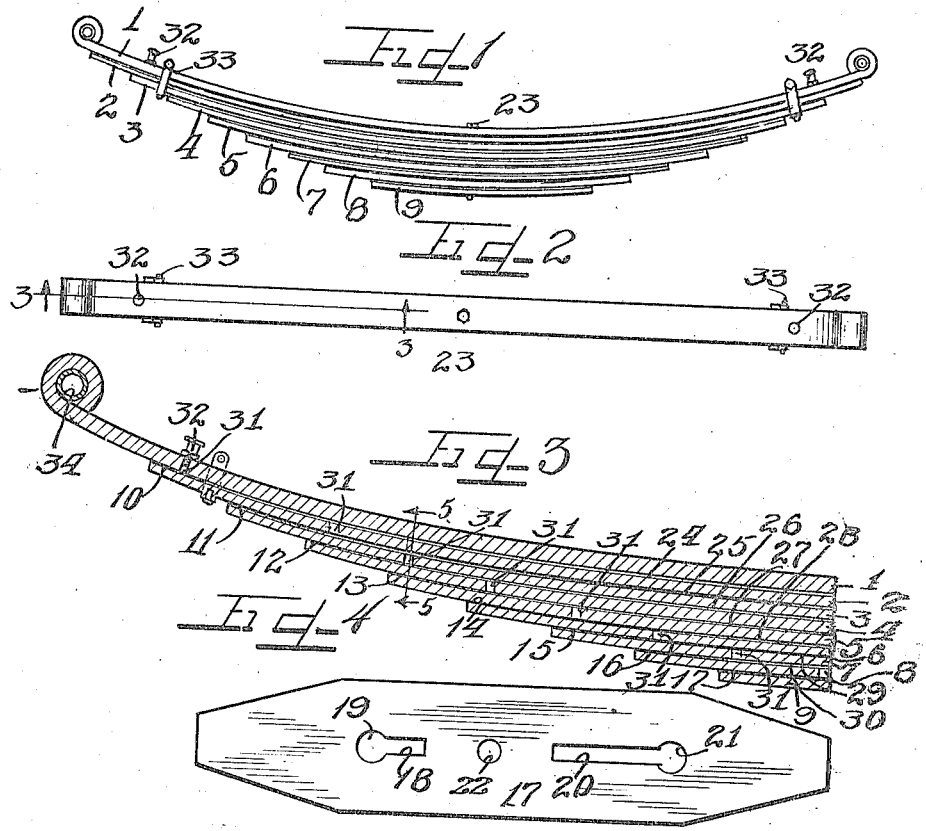
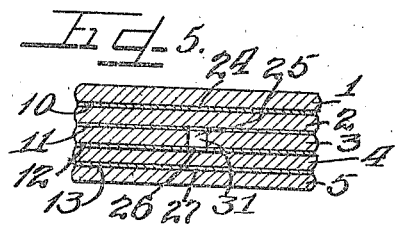

UNITED STATES PATENT OFFICE.

ROSWELL C. ERWIN, OF OAK PARK, ILLINOIS.

SELF-LUBRICATING SPRING.

1,249,361.

Specification of Letters Patent. Patented Dec. 11, 1917.

Application filed December 27, 1915. Serial No. 33,779.

*To all whom it may concern:*

Be it known that I, ROSWELL C. ERWIN, a citizen of the United States, and a resident of the town of Oak Park, in the county of Cook and State of Illinois, have invented certain new and useful Improvements in Self-Lubricating Springs; and I do hereby declare that the following is a full, clear, and exact description of the same, reference being had to the accompanying drawings, and to the numerals of reference marked thereon, which form a part of this specification.

This invention relates to an improved type of self-lubricating spring wherein inserts are provided between the leaves of the spring, said inserts having channels therein affording passages for flow of lubricant along the leaves and from one spring leaf to another through apertures provided in the leaves of the spring.

It is an object therefore of this invention to construct a self-lubricating spring employing the use of inserts between each of the leaves of the spring with slots in said inserts affording channels leading between apertures provided through the leaves of the spring to permit admission of lubricant between all the leaves of the spring.

It is also an object of this invention to construct a self-lubricating spring comprising a plurality of leaves apertured near their ends and with flexible metal inserts between the leaves of the spring, said inserts having slots therein communicating between the respective apertures of leaves of the spring whereby a lubricant may be introduced through one of the leaves of the spring to flow through the passages afforded between all of the leaves of the spring.

It is furthermore an important object of this invention to construct a self-lubricating spring having flexible metal inserts between the leaves of the spring provided with passages to afford channels for the flow of lubricant lengthwise between the leaves of the spring and communicating with apertures at the overlapping ends of the spring leaves to permit a flow of lubricant from one spring leaf to another.

It is finally an object of this invention to construct a self-lubricating spring wherein channels are provided between the leaves of the spring to permit a flow of lubricant therein and from between one pair of spring leaves to another.

The invention (in a preferred form) is illustrated in the drawings and hereinafter more fully described.

In the drawings:

Figure 1 is a side elevation of a spring embodying the principles of my invention.

Fig. 2 is a top plan view of the spring.

Fig. 3 is a fragmentary sectional detail taken on line 3—3 of Fig. 2.

Fig. 4 is a plan view of one of the spring leaf inserts.

Fig. 5 is a sectional detail taken on line 5—5 of Fig. 3.

As shown in the drawings:

The reference numerals 1, 2, 3, 4, 5, 6, 7, 8, and 9, indicate the various curved leaves of decreasing length constituting the spring, which is of the semi-elliptic type, and laid between the respective leaves of the spring are metal inserts also of decreasing length, which are more clearly shown in Fig. 3, denoted respectively by the reference numerals 10, 11, 12, 13, 14, 15, 16, and 17. Each of the respective inserts is provided with longitudinal slots therein, of which one of the slots in the insert 17, which is shown in detail in Fig. 4, is denoted by the reference numeral 18, terminating in a rounded aperture 19, and on the other side near the middle of said insert is another longitudinal slot 20, terminating in a rounded aperture 21. A central aperture 22, is provided in said insert 17, as well as in the other of said inserts and also in the leaves of the spring through which a king bolt 23, is inserted. Each of the respective inserts between the leaves of the spring is slotted similarly to the insert 17, shown in detail in Fig. 4, thus affording channels between the respective leaves of the spring which are denoted by the reference numerals 24, 25, 26, 27, 28, 29, and 30. Each of the leaves of the spring is provided with an aperture therethrough, the respective apertures all denoted by the reference numeral 31, which are disposed so that the lower ends of the apertures register with the ends of the slots in the inserts affording the channels between the spring leaves, whereby the lubricant may flow from between one pair of spring leaves to another pair thereof through the respective apertures 31, and channels between the leaves.

Secured in any suitable manner at each end upon the long top leaf 1, of the spring, are grease or oil cups 32, adapted to feed lubricant through the apertures 31, the lubricant then flowing through the respective channels and apertures which afford communication between the spaces between the leaves of the spring. As shown, the usual spring clips 33, are provided, which engage around the ends of the uppermost spring leaves 1, 2, and 3, and the extreme ends of the uppermost leaf 1, are turned over and provided with a bushing 34, therethrough, for attachment of the spring shackles by which the spring is connected in position for use upon a vehicle.

The operation is thought to be obvious from the description.

I am aware that the details of construction may be varied through a wide range without departing from the principles of this invention, and I therefore do not purpose limiting the patent granted otherwise than necessitated by the prior art.

I claim as my invention:

1. In a spring, the combination of the leaves thereof, flexible metal inserts between said leaves having slots providing channels between said leaves, said leaves having apertures near their ends out of alinement with each other and registering with said slots to afford communication between said slots, and lubricant supply means secured in the apertures of one of said leaves.

2. In a spring, the combination of a plurality of leaves of different lengths laid one upon another, a plurality of flexible inserts of different lengths corresponding to the length of said leaves, said leaves having apertures therethrough out of alinement with each other, and said inserts having slots therein registering with said apertures for the passage of lubricant through said spring leaves and between the same, and lubricant supply means secured in an aperture of one of said leaves.

In testimony whereof I have hereunto subscribed my name in the presence of two subscribing witnesses.

ROSWELL C. ERWIN.

Witnesses:
CHARLES W. HILLS, Jr.,
EARL M. HARDINE.